US010982801B2

(12) United States Patent
Lecbych et al.

(10) Patent No.: US 10,982,801 B2
(45) Date of Patent: Apr. 20, 2021

(54) PROFILED CLAMP

(71) Applicant: NORMA Germany GmbH, Maintal (DE)

(72) Inventors: Miroslav Lecbych, Dolni Dunajovice (CZ); Lukáš Polášek, Hluk (CZ); Julius Oplustil, Babice u Rosic (CZ); Jiri Zukal, Brno (CZ)

(73) Assignee: Norma Germany GmbH, Maintal (DE)

( * ) Notice: Subject to any disclaimer, the term of this patent is extended or adjusted under 35 U.S.C. 154(b) by 262 days.

(21) Appl. No.: 16/082,206

(22) PCT Filed: Mar. 2, 2017

(86) PCT No.: PCT/EP2017/054974
§ 371 (c)(1),
(2) Date: Sep. 4, 2018

(87) PCT Pub. No.: WO2017/149103
PCT Pub. Date: Sep. 8, 2017

(65) Prior Publication Data
US 2019/0211953 A1     Jul. 11, 2019

(30) Foreign Application Priority Data

Mar. 4, 2016   (DE) .......................... 102016103988.8

(51) Int. Cl.
*F16L 23/08*   (2006.01)
*F16B 2/06*   (2006.01)
(52) U.S. Cl.
CPC ............. *F16L 23/08* (2013.01); *F16B 2/065* (2013.01)

(58) Field of Classification Search
CPC ................................ F16L 23/08; F16B 2/065
See application file for complete search history.

(56) References Cited

U.S. PATENT DOCUMENTS 2,269,664 A * 1/1942 Hallerberg .............. F16L 23/08
                                                        285/332.3
2,663,582 A    12/1953 Sebok
(Continued)

FOREIGN PATENT DOCUMENTS

DE       29816889 U1   11/1998
DE    102009039862 B4   9/2011
(Continued)

OTHER PUBLICATIONS

Japanese Office Action for Japanese Application No. 2018-546604 dated Sep. 3, 2019 (4 pages).
(Continued)

*Primary Examiner* — James M Hewitt, II
(74) *Attorney, Agent, or Firm* — Reising Ethington, P.C.

(57) ABSTRACT

A profiled clamp having a first profiled clamp half and a second profiled clamp half, by means of which two flange parts can be connected to each other while applying an axial force, wherein a first tightening head is formed at an end of the first clamp half and a second tightening head is formed at an end of the second clamp half in order to form a tightening device. The ends of the clamp halves opposite the tightening heads are connected to each other by means of an articulated connection. The articulated connection is formed by means of a flat strip section.

7 Claims, 3 Drawing Sheets

(56) References Cited

U.S. PATENT DOCUMENTS

| | | | |
|---|---|---|---|
| 2,897,569 A | 8/1959 | Kastner | |
| 6,464,268 B1 * | 10/2002 | Hough | F16L 23/08 |
| | | | 285/367 |

FOREIGN PATENT DOCUMENTS

| | | | |
|---|---|---|---|
| DE | 202013011706 U1 | 3/2014 | |
| DE | 102016111117 A1 * | 12/2017 | ............ F01N 13/14 |
| EP | 0403379 A1 | 12/1990 | |
| EP | 2292964 A2 * | 3/2011 | ......... F01N 13/1872 |
| EP | 2792923 A1 | 10/2014 | |
| EP | 2884145 A1 | 6/2015 | |
| JP | S59144863 U | 9/1984 | |
| JP | S61129908 U | 8/1986 | |
| JP | H0346016 U | 4/1991 | |
| JP | H07233888 A | 9/1995 | |
| JP | 6061981 B2 * | 1/2017 | ............ F16L 23/08 |
| KR | 100758182 B1 | 9/2007 | |
| WO | 2004090347 A1 | 10/2004 | |
| WO | 2008102116 A2 | 8/2008 | |

OTHER PUBLICATIONS

English Translation of Japanese Office Action for Japanese Application No. 2018-546604 dated Sep. 3, 2019 (9 pages).
First Korean Office Action for Korean Application No. 10-2018-7028598 dated Oct. 28, 2019 (9 pages).
English Translation of First Korean Office Action for Korean Application No. 10-2018-7028598 dated Oct. 28, 2019 (9 pages).
International Search Report for PCT/EP2017/054974, dated Jun. 27, 2017, 4 pages.
English Translation of International Search Report for PCT/EP2017/054974, dated Jun. 27, 2017, 3 pages.
1st German Office Action for DE 10 2016 103 988.8 dated Jan. 31, 2017, 9 pages.

* cited by examiner

PROFILED CLAMP

INTRODUCTION

The present disclosure relates to a profiled clamp having a first profiled clamp half and having a second profiled clamp half, by way of which two flange parts are connectable together thereby applying an axial force, wherein, for forming a tightening device, a first tightening head is realized at one end of the first clamp half and a second tightening head is realized at one end of the second clamp half, and wherein the ends of the clamp located opposite the tightening heads are connected together by means of an articulated connection.

WO 2008/102,116 A2 discloses a profiled clamp which comprises two profiled clamp halves. The profiling of the clamp halves is realized such that a triangular form, a roof edge form or a trapezoid form is utilized for the purpose of connecting two flange parts together. When a circumferential force is applied into the clamp halves, the two flange parts are connected together thereby forming an axial force. The profiled clamp comprises a tightening device which is formed by a first tightening head and a second tightening head which are each realized on the end of one of the clamp halves. The two tightening heads are connected together by way of a screw element such that the profiled clamp is tightened as a result of tightening the screw element.

The two clamp halves are connected together diametrically opposite the tightening device by way of a connecting element which is realized from a spring steel material. The connecting element is welded onto the respective end faces of the clamp halves. As a result of the resilient characteristics of the connecting element, an articulated connection is created between the two clamp halves such that they are able to be moved open and closed and are permanently connected together.

A further example from the prior art is shown in FIGS. 1 and 2. The profiled clamp 1 shown comprises a first clamp half 10 and a second clamp half 11. The clamp halves 10 and 11 are connected together by means of a screw element 18 in combination with a nut 24 via first and second tightening heads 12 and 13 which are molded on the end faces of said clamp halves. A ring-like connecting element 22 is situated on the ends of the clamp halves 10 and 11 located opposite the tightening heads 12 and 13. The ends of the clamp halves 10 and 11 can be hooked into the connecting element 22. As a result, an articulated connection is created between the clamp halves 10, 11. However, it only possible to position the clamp halves 10, 11 with respect to one another in a poor manner. In addition, the articulated connection by means of the connecting element 22 does not enable transmission of particularly high flange forces which could actually be applied with the tightening device such that there is a limit on the maximum flange forces as a result of the connecting element 22.

Finally, EP 0 403 379 A1 discloses a three-membered profiled clamp with articulated connections which are realized in the form of film joints between three profiled clamp parts. The two articulated connections are realized merging between the three clamp parts in uniform materials and said three clamp parts are formed as a result of the profiling of the clamp parts merging into a flat cross sectional form of the strip material at the joint connections. Disadvantageously, damage rapidly occurs to the material of the articulated connections if, for example, they are bent back and forth multiple times.

SUMMARY

It is one object of the disclosure, in an embodiment, to develop further a profiled clamp for the connection of two flange parts thereby applying as high an axial force as possible. In addition, the production of the profiled clamp is to be simplified such that the profiled clamp is producible in particular in a simpler manner. The number of individual parts to produce the profiled clamp is preferably to be reduced.

The disclosure, in an embodiment, provides that the articulated connection is formed by means of a flat strip portion.

The flat strip portion, in this case, describes a portion which is realized with an extension in the circumferential direction and comprises a length in the circumferential direction of the profiled clamp which corresponds, for example, at least to the width of the strip material of the clamp halves in the initial width. The material of the flat strip portion, in this case, merges in one part and in a uniform manner into the material of the clamp halves such that both clamp halves are connected together in one part. As a result of the flat realization of the articulated connection as a flat strip portion, there is reduced bending rigidity such that it is possible, without any greater plastic deformation, to bend the clamp halves open and closed with respect to one another by means of deforming the flat strip portion, without the flat strip portion being damaged. Compared to a previously utilized connecting element, for example in an annular form with the ends of the clamp halves hooked-in, it is possible to apply very large circumferential forces onto the clamp halves by means of a flat strip portion which merges in one piece into the clamp halves such that the flange parts are connectable together with a greater axial force. In addition, the production of the profiled clamps is simplified as the two clamp halves, the tightening heads and the articulated connection can be produced from one single component proceeding from a flat strip portion without further joining steps having to be carried out. Said flat strip material is produced as a result of corresponding punch-bending operations on the two clamp halves with the flat strip portions lying in between to form the articulated connection. A further advantage is provided, in an embodiment, with improved positioning of the two clamp halves with respect to one another. In particular, if the profiled clamp is mounted in regions that are difficult to access, the two clamp halves then no longer have to be positioned extra-carefully with respect to one another. The flat strip portion can be pre-tensioned such that the clamp halves are substantially closed to one another such that the two tightening heads are located opposite one another. As a result, mounting is made even easier as the two tightening heads are able to be gripped in a simple manner in order to close the tightening device using, for example, a screw element.

A further advantage may be achieved, in an embodiment, when a hole is introduced in the flat strip portion. The hole, in this case, can be realized in a round, angular or oval manner. By means of the hole, a positioning of the profiled clamp on the flange can be defined in the direction of rotation by a projection which is assigned to the hole on the flange engaging in the hole. If the hole is realized in the circumferential direction in an elongated manner, for example in an oval manner, the hole in conjunction with the projection provides a certain rotation region, for example for adjusting the profiled clamp. The advantage may be additionally achieved that when the connecting element of the two tightening heads is tightened, that is to say, for example, when a screw element is tightened, the profiled clamp is not able to rotate or is only able to rotate in a very limited manner on the flange in the circumferential direction.

The hole is designed, in an embodiment, such that it comprises a dimension of, for example, between 3 mm and 8 mm in a main direction, wherein a secondary direction, which is placed transversely with respect to the main direction, is realized in a smaller manner and comprises a dimension of, for example, between 2 mm and 4 mm. A corresponding projection on the flange, in particular on one of the two flange parts to be connected, is able to be adapted to the dimensions of the hole.

According to an embodiment of the profiled clamp, the first tightening head comprises a rectangular passage, through which a screw element with a complementarily realized rectangular shoulder is insertable. As a result, rotation of the screw element is prevented when said screw element is inserted in the first tightening head. The screw element can be screw-connected at the back of the second tightening head with a self-locking nut, the nut being tightened on the screw element to close the tightening device.

To apply a high closing force by means of the tightening device, pressing lugs, which can move to bear against one another when the screw element is tightened, are realized on the end faces of the tightening heads. As a result, bending of the tightening heads in the transition into the clamp halves is avoided in particular and the tightening heads remain parallel to one another, as a result of which better tightening of the tightening heads is produced. This can increase the closing force of the tightening device that is able to be applied, an increased closing force leading to a greater circumferential force in the tightening heads which is transmitted by means of the flat strip portion via the articulated connection according to the invention.

According to an embodiment of the profiled clamp, the flat strip portion comprises a tapering which is formed by lateral edge incisions compared to an initial width of the profiled clamp halves. The initial width of the clamp halves is produced when the trapezoidal structure, triangular structure or roof structure of the clamp halves is unwound into a flat structure. The thus formed initial width comprises a greater width than the width of the flat strip portion. If the edges of the initial width are curved to form the clamp halves in order to achieve the triangular form, trapezoid form or roof form, the tapering of the flat strip portion can be set up such that the profiled clamp has a constant width between the clamp halves and the flat strip portion although the flat strip portion does not comprise any profiling and is realized in a planar manner transversely to the circumferential direction of the clamp halves.

BRIEF DESCRIPTION OF THE FIGURES

Further measures which improve the disclosure together with the description of a preferred exemplary embodiment of the invention are shown in more detail below by way of the figures, in which.

DETAILED DESCRIPTION

Figure 1:
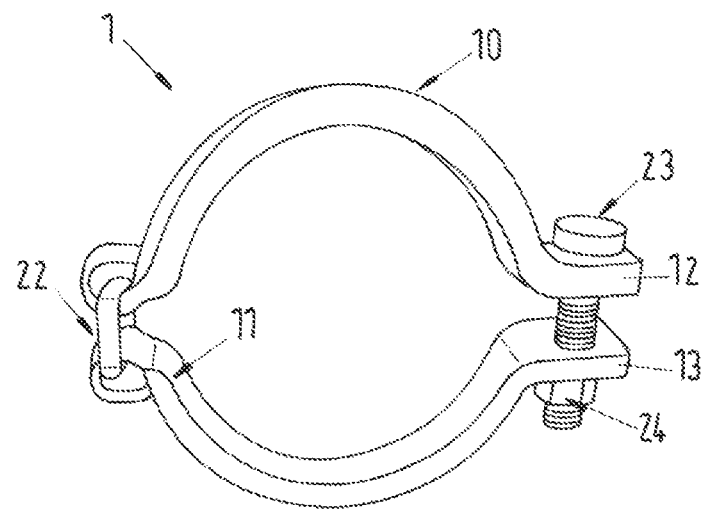
FIG. 1 shows a profiled clamp according to the prior art.
Figure 2:
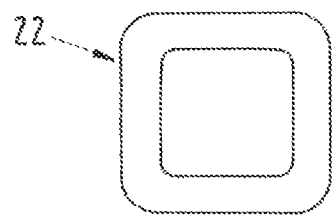
FIG. 2 shows a connecting element for forming an articulated connection between two clamp halves according to FIG. 1.

FIG. 1 shows a profiled clamp 1 according to the prior art. The profiled clamp 1 comprises a first clamp half 10 and a second clamp half 11. A connecting element 22, which is shown in an enlarged manner in FIG. 2 (prior art), serves to connect the two clamp halves 10, 11. The ends of the clamp halves 10 and 11 engage in the rectangular connecting element 22 and are bent around such that the clamp halves 10 and 11 are arranged in a captive manner on the connecting element 22. In a disadvantageous manner, however, there is no specific positioning of the two clamp halves 10 and 11 with respect to one another. Moreover, the forces transmittable between the clamp halves 10 and 11 are limited by the connecting element 22.

The tightening device is realized with a screw element 23 and with a nut 24 such that the two tightening heads 12 and 13, which are realized on the respective clamp halves 10 and 11, are able to be guided toward one another and tightened when the nut 24 is screwed further onto the screw element 23.

Figure 3:
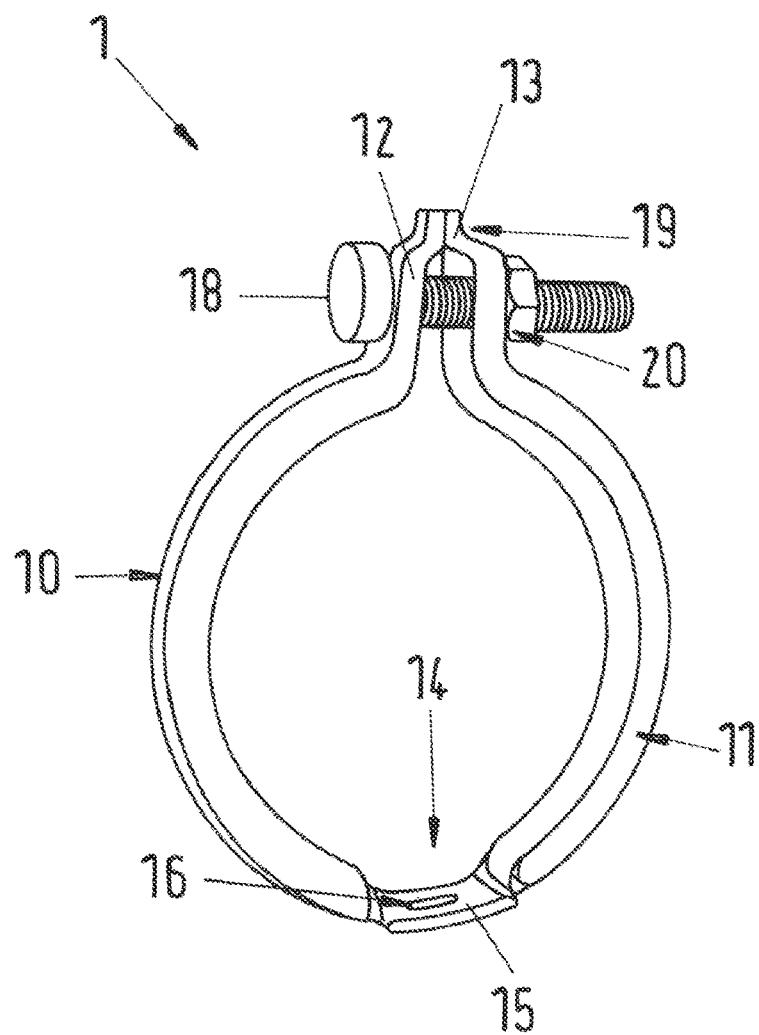
FIG. 3 shows a profiled clamp.

FIG. 3 shows a profiled clamp 1 with features of an embodiment thereof. The first clamp half 10 and the second clamp half 11 are connected together in an articulated manner by way of an articulated connection 14 in the form of a flat strip portion 15. The flat strip portion 15 merges in one part in the same material into the respective clamp halves 10 and 11. A hole 16 is situated in the center of the flat strip portion 15. The flat strip portion 15 is realized flexibly in such a manner that the two clamp halves 10 and 11 are able to be moved toward one another and away from one another without the flat strip portion 15 being damaged. The hole 16 serves for the defined positioning of the profiled clamp 1 on a flange by a corresponding projection on the flange being able to engage in the hole 16. Rotation of the profiled clamp 1 in the circumferential direction is prevented as a result.

Tightening heads 12 and 13 are integrally molded on the clamp halves 10 and 11, the tightening heads 12 and 13 being integrally molded on the clamp halves 1 and 11 lying opposite the flat strip portion 15. Pressing lugs 19, which, when the self-locking nut 20 is tightened on the screw element 18, are able to move into contact with one another in order to obtain an improved tightening situation of the clamp halves 10 and 11 with respect to one another, are situated on the end faces of the clamp halves 10 and 11.

Figure 4:
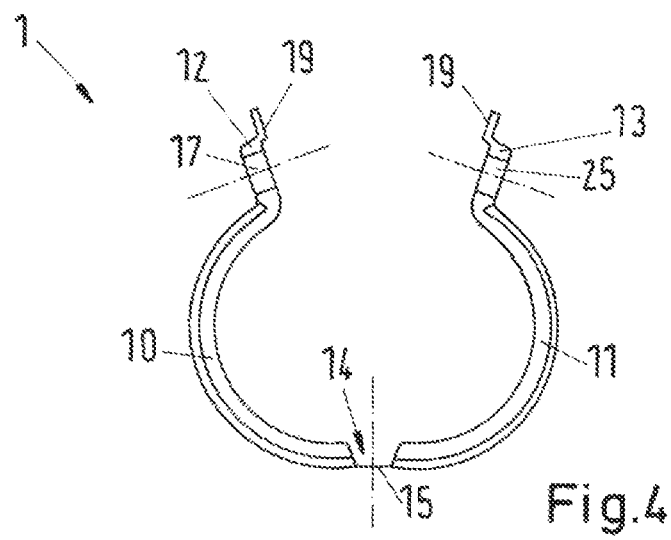
FIG. 4 shows a side view of the profiled clamp.
Figure 5:
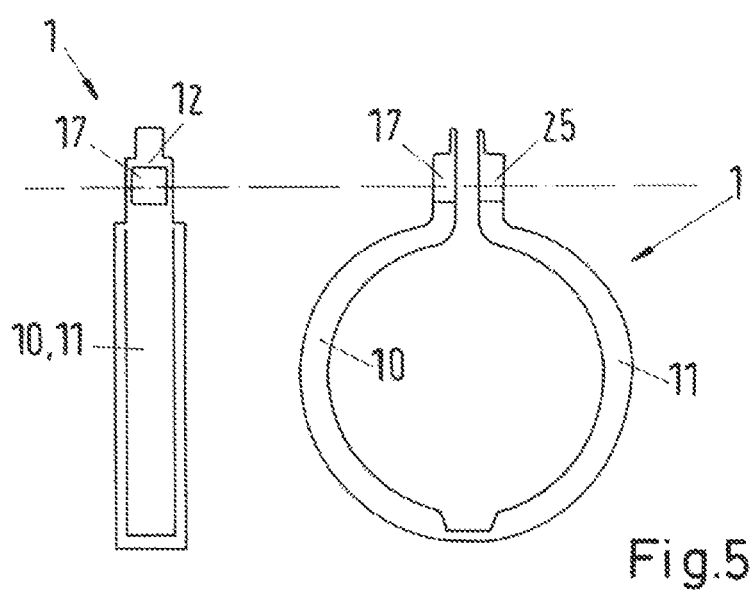
FIG. 5 shows a further side view and a rotated view of the profiled clamp and FIG. 6 shows unwound flat material, from which the single-part profiled clamp is producible.

FIGS. 4 and 5 show further views of the profiled clamp 1. FIG. 4 shows the profiled clamp 1 with first and second clamp halves 10 and 11 which are open toward one another, the articulated connection 14 between the two clamp halves 10 and 11 again being formed by the flat strip portion 15. Through holes are inserted in the tightening heads 12 and 13, a passage 17 being realized in the first tightening head 12 and a passage 25 being realized in the second tightening head 13. A pressing lug 19 is situated on each of the free ends of the first and second tightening heads 12 and 13.

As shown in the two views in FIG. 5, the passage 17 is realized with a rectangular cross section into which a complementarily realized rectangular shoulder of the screw element (item 18, FIG. 3) is insertable. The passage 25 can be realized in a round manner in contrast.

Figure 6:
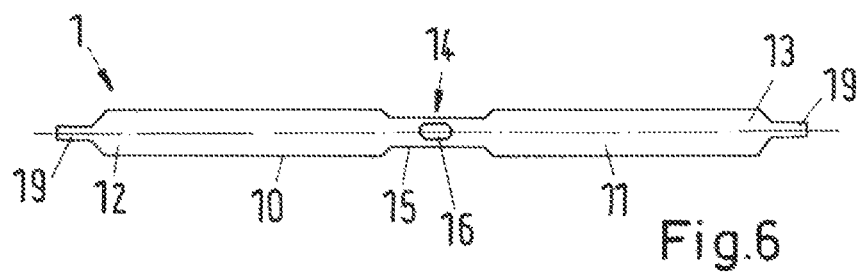

Finally, FIG. 6 shows starting material for forming the profiled clamp 1 with multiple portions. The starting material can be a flat strip steel, and the different portions of the flat strip steel form the first clamp half 10, the flat strip portion 15 for forming the articulated connection 14 and the second clamp half 11. At the end faces, the first and second tightening heads 12 and 13 connect to the integrally molded pressing lugs 19. The inserted hole 16 is shown in the center of the flat strip portion 15. As a result of following punching and bending operations, the profiled clamp 1 can be realized ready-for-use, as shown in FIGS. 4 and 5.

The profiled clamp according to the embodiment presented here can be used for various applications. The use of the profiled clamp in the area of turbochargers of motor vehicles is particularly suitable. In this case, a connection between a turbine housing and a central housing of the turbocharger is secured by means of the clamp, at the same time the turbine housing and the central housing being pressed toward one another such that additional sealing is produced.

The invention is not restricted in its realization to the aforementioned preferred exemplary embodiment. Rather, a number of variants, which make use of the solution shown even in the case of realizations which are fundamentally different, are conceivable. All features and/or advantages, including structural details or spatial arrangements, emanating from the claims, the description or the drawings, can be essential to the invention both on their own per se and in the most varied combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A profiled clamp for use in a motor vehicle turbocharger system having a first profiled clamp half and having a second profiled clamp half, by way of which two flange parts are connectable together thereby applying an axial force, wherein, for forming a tightening device, a first tightening head is realized at one end of the first clamp half and a second tightening head is realized at one end of the second clamp half, wherein the ends of the clamp halves located opposite the tightening heads are connected together by means of an articulated connection, wherein the articulated connection is formed by means of a flat strip portion, wherein a hole is introduced into the flat strip portion, and wherein, the flat strip portion comprises a tapering constituted by lateral edge incisions compared to an initial width of the profiled clamp halves, the initial width of the profiled clamp halves being greater than the width of the flat strip portion.

2. The profiled clamp as claimed in claim 1, wherein the hole is realized in a round, angular or oval manner.

3. The profiled clamp as claimed in claim 2, wherein the hole comprises a dimension of between approximately 3 mm and 8 mm in a main direction, wherein a secondary direction located transversely with respect to the main direction comprises a dimension of between approximately 2 mm and 4 mm.

4. The profiled clamp as claimed in claim 1, wherein the first tightening head comprises a rectangular passage, through which a screw element with a complementarily realized rectangular shoulder is insertable.

5. The profiled clamp as claimed in claim 4, wherein pressing lugs, which move to bear against one another when the screw element is tightened, are realized on the end faces of the tightening heads.

6. The profiled clamp as claimed in claim 4, wherein the screw element is screw-connected with a self-locking nut.

7. The profiled clamp as claimed in claim 1, wherein the flat strip portion is a one-piece extension of the first profiled clamp half and second profiled clamp half, and extends between the first and second profiled clamp halves.

* * * * *